US010497556B2

(12) United States Patent
Skinner et al.

(10) Patent No.: US 10,497,556 B2
(45) Date of Patent: Dec. 3, 2019

(54) ULTRAVIOLET LAMP SYSTEMS AND METHODS OF OPERATING AND CONFIGURING THE SAME

(71) Applicant: Heraeus Noblelight America LLC, Gaithersburg, MD (US)

(72) Inventors: Brett Skinner, Silver Spring, MD (US); Darrin Leonhardt, Gaithersburg, MD (US); Charles H. Wood, Rockville, MD (US)

(73) Assignee: Heraeus Noblelight America LLC, Gaithersburg, MD (US)

( * ) Notice: Subject to any disclaimer, the term of this patent is extended or adjusted under 35 U.S.C. 154(b) by 0 days.

(21) Appl. No.: 16/179,400

(22) Filed: Nov. 2, 2018

(65) Prior Publication Data

US 2019/0139753 A1    May 9, 2019

Related U.S. Application Data

(60) Provisional application No. 62/581,301, filed on Nov. 3, 2017.

(51) Int. Cl.
*H01J 65/04* (2006.01)
*H01J 23/34* (2006.01)
*H01J 25/50* (2006.01)
*H02M 3/335* (2006.01)

(52) U.S. Cl.
CPC ............ *H01J 65/044* (2013.01); *H01J 23/34* (2013.01); *H01J 25/50* (2013.01); *H02M 3/335* (2013.01)

(58) Field of Classification Search
CPC .......... H01J 65/044; H01J 23/34; H01J 25/50; H02M 3/335

USPC ...................................................... 315/39.51
See application file for complete search history.

(56) References Cited

U.S. PATENT DOCUMENTS

| 4,042,850 | A | 8/1977 | Ury et al. |
| 4,710,638 | A | 12/1987 | Wood |
| 4,988,922 | A * | 1/1991 | Shoda ................... H01J 65/044 |
| | | | 315/207 |
| 5,306,987 | A | 4/1994 | Dakin et al. |
| 5,438,242 | A | 8/1995 | Simpson |
| 6,419,749 | B1 | 7/2002 | Rhoades |
| 6,922,114 | B2 | 7/2005 | Kästle et al. |
| 7,401,943 | B2 | 7/2008 | Okamitsu et al. |
| 8,785,868 | B2 | 7/2014 | Yang et al. |

(Continued)

FOREIGN PATENT DOCUMENTS

WO       2012009353        1/2012

OTHER PUBLICATIONS

Invitation to Pay Additional Fees with Partial International Search Report dated Mar. 19, 2019 from Corresponding International Patent Application No. PCT/US2018/059023.

*Primary Examiner* — Don P Le
(74) *Attorney, Agent, or Firm* — Stradley Ronon Stevens & Young, LLP

(57) ABSTRACT

An ultraviolet lamp system is provided. The ultraviolet lamp system includes: (a) a bulb; (b) at least one magnetron configured to emit microwave energy configured to be received by the bulb; and (c) a power supply configured to provide electrical energy to the at least one magnetron, the power supply being adapted to modulate the electrical energy provided to the at least one magnetron such that light output from the bulb is more uniform in at least one of intensity and spectral output.

9 Claims, 6 Drawing Sheets

(56) References Cited

U.S. PATENT DOCUMENTS

| | | | |
|---|---|---|---|
| 2003/0042857 A1 | 3/2003 | Suzuki et al. | |
| 2003/0141828 A1* | 7/2003 | Choi | H01J 61/52 |
| | | | 315/248 |
| 2005/0012462 A1* | 1/2005 | Barry | H01J 65/044 |
| | | | 315/39.53 |
| 2008/0315799 A1* | 12/2008 | Park | H01J 61/106 |
| | | | 315/344 |
| 2009/0195160 A1 | 8/2009 | Shinogi | |
| 2012/0019148 A1* | 1/2012 | Yang | H02M 3/335 |
| | | | 315/141 |
| 2013/0093322 A1* | 4/2013 | Borsuk | H05B 41/2806 |
| | | | 315/39.51 |
| 2013/0278140 A1 | 10/2013 | Mudunuri et al. | |
| 2015/0305097 A1* | 10/2015 | Ashida | H05B 6/80 |
| | | | 219/690 |
| 2017/0117131 A1* | 4/2017 | Khoury | H01J 61/52 |

* cited by examiner

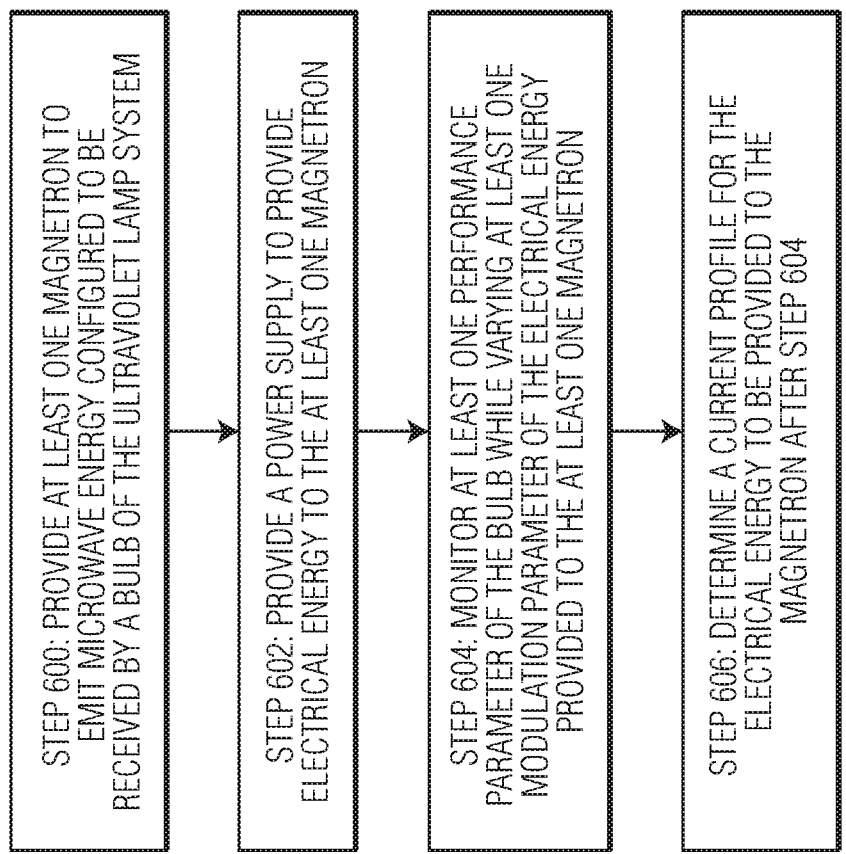

ULTRAVIOLET LAMP SYSTEMS AND METHODS OF OPERATING AND CONFIGURING THE SAME

CROSS-REFERENCE TO RELATED APPLICATION

This application claims the benefit of U.S. Provisional Patent Application No. 62/581,301, filed Nov. 3, 2017, the content of which is incorporated herein by reference.

FIELD

The invention relates to ultraviolet lamp systems, and more particularly, to ultraviolet lamp systems, as well as improved methods of operating and configuring such systems.

BACKGROUND

Ultraviolet (UV) lamp systems have been in use for many years in applications such as UV curing. Many conventional industrial high wattage electrodeless UV curing lamp systems have been based around a modular 10 inch long lamp (irradiator module) which contains a tubular electrodeless bulb envelope powered by two magnetrons mounted on waveguides that direct microwave energy (RF) into a common elliptical reflector cavity. These modular irradiators can be placed end to end to provide a continuous UV curing zone for applications of variable length. U.S. Pat. No. 4,042,850 illustrates details of such conventional systems, and is hereby incorporated by reference herein in its entirety.

Magnetrons emit microwaves from an output antenna into a metal waveguide inside the lamp which directs the RF into a reflector cavity containing the bulb. The electrodeless, tubular quartz bulb is filled with a small amount of mercury, an easily ionized gas such as Argon along with other additives such as metal halide salts to modify and enhance the spectral output. The high-frequency (e.g., 2.45 GHz), high power (e.g., up to 3 kW RF) electric field generated by each of the two magnetrons excites the gas inside the bulb to high energy levels, vaporizing and ionizing the mercury and additives with an average power up to 600 watts per linear inch. The resulting high energy collisions of the vaporized molecules cause the bulb to emit a large amount of UV energy that also includes some visible and infrared radiation. The enhanced UV output possible with certain bulb fill additives, such as the Iron Iodide additive, is one of the primary advantages of electrodeless UV lamps.

Power for each irradiator module comes from a dedicated power supply connected by cables to that irradiator module. The power supply must include voltage conversion components in order to drive the two magnetrons at high DC voltage. This normally involves a pair of voltage conversion engines with each individual engine connected to a single magnetron. The power supply enclosure also contains many other components for additional services such as user and machine power level control and display interfaces, magnetron filament control logic, protective interlock functions, etc.

The voltage conversion components can be based on a ferro-resonant principle that uses transformers, diodes and capacitors to rectify the AC line voltage and transform the output to the much higher DC voltage utilized by the magnetrons. They can also be based on more modern and efficient solid state high frequency switching components.

Both ferro-resonant and switch mode power supplies are currently available in the market and both are being used interchangeably to drive ten inch microwave lamp irradiators such as described above. Each of the two power supply designs have advantages and disadvantages.

Microwave powered lamp systems using ferro-resonant power supplies generally have high ripple magnetron current characteristics which therefore generate high ripple UV output. A transformer for the second magnetron is generally powered with a different leg (different from the leg for the first magnetron) of a 3 phase supply line, and therefore the ripple of the second magnetron can be 120° out of phase with the first magnetron. Ferro-resonant power supplies tend to be less efficient compared to solid state power supplies. Ferro-resonant power supplies are very heavy due to the heavy transformers (e.g., up to 4 times heavier). Slot arcing and magnetron internal arcing or moding tends to be a more significant problem when using high ripple power supplies due to the extra high peak current and voltage that occur compared to low ripple solid state power supplies. Ferro-resonant power supplies must have separate versions for the different line voltages and frequencies (50 or 60 Hz) used worldwide. The magnetron RF output power can also drop to near zero 100-120 times a second and may peak at levels much higher than the average power. Likewise, the UV output from either end of the bulb closely follows the modulation ripple of the respective magnetron current. Normally the power supply is wired with 3 phase AC power such that one magnetron can operate out of phase from the second magnetron. In this case the mixing of the UV in the focal plane of the lamp will mitigate some of the high ripple effect. However, the ripple at the focal plane is most evident towards the ends of the lamp module since there is less contribution from the far end of the lamp. This low point in the modulated UV output can be a problem for high speed curing applications passing under the lamp since all areas of the coating to be cured may not be uniformly cured. In wide web applications, using multiple lamp modules stacked end to end, there can be areas cured less than other areas due to the same high ripple issue especially when the two adjoining magnetrons happen to be operating in-phase.

Modern solid state DC switching power supplies designed for electrodeless UV lamps have been available for many years with enhanced features such as more precise power level control. With switching frequencies above the KHz range they provide a virtually continuous UV output with no ripple. They also do not suffer from the disadvantages noted above for ferro-resonant power supplies.

However, a major problem when operating with continuous, no ripple, output power supplies has commonly been referred to as "color separation" along the axis of the bulb when operating additive bulb types vertically. Many curing applications (e.g., certain rotating bottle or cans applications, certain optical fiber draw tower applications, etc.) tend to utilize a vertical lamp orientation. High performance additive bulbs such as the "D" bulb type (e.g., having an Iron Iodide additive) and the "V" bulb type (e.g., having an Gallium Iodide additive) are both subject to color separation when vertical and powered by a low ripple supply. The "D" type bulbs are widely used due to superior enhancement of the UVA output, and the "V" bulb type is enhanced in the UVV band. However, they are not able to maintain an adequate distribution of the fill material inside the bulb when the bulb axis is angled or used in vertical operation. Both of these bulbs, and other additive bulbs, perform poorly and become inefficient when operated vertically with DC power.

When a conventional bulb (e.g., a 9 inch long cylinder of varying diameter) is operated in a non-horizontal (e.g., vertical, angled, etc.) geometry, the bulb fill and additives tend to migrate more to the bottom of the bulb resulting in an undesirable operating condition. Microwave coupling to the upper half of the bulb is greatly reduced due to a lack of adequate vaporized fill materials remaining and the overall UV output is diminished by about 25%. In addition the bulb tends to run significantly hotter than normal in the lower half of the bulb. For example, excessively high peak bulb wall temperatures (e.g., greater than 1150° C.) may result from non-uniform wall loading, and may reduce bulb life considerably and may result in catastrophic bulb envelope failures due to severely overheated bulb envelopes.

Thus, it would be desirable to provide systems and methods for improving operation of UV lamps especially during operation of the lamp in a non-horizontal (e.g., vertical, angled, etc.) orientation.

SUMMARY

According to an exemplary embodiment of the invention, an ultraviolet lamp system is provided. The ultraviolet lamp system includes: (a) a bulb; (b) at least one magnetron configured to emit microwave energy configured to be received by the bulb; and (c) a power supply configured to provide electrical energy to the at least one magnetron, the power supply being adapted to modulate the electrical energy provided to the at least one magnetron such that light output from the bulb is more uniform in at least one of intensity and spectral output.

According to another exemplary embodiment of the invention, a method of operating an ultraviolet lamp system is provided. The method comprises the steps of: (a) providing at least one magnetron to emit microwave energy configured to be received by a bulb of the ultraviolet lamp system; and (b) modulating electrical energy provided to the at least one magnetron such that light output from the bulb is more uniform in at least one of intensity and spectral output.

According to yet another exemplary embodiment of the invention, a method of configuring an ultraviolet lamp system is provided. The method comprises the steps of: (a) providing at least one magnetron to emit microwave energy configured to be received by a bulb of the ultraviolet lamp system; (b) providing a power supply to provide electrical energy to the at least one magnetron; (c) monitoring at least one performance parameter of the bulb while varying at least one modulation parameter of the electrical energy provided to the at least one magnetron; and (d) determining a current profile for the electrical energy to be provided to the magnetron after step (c).

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawings are the following figures:

FIG. 6 is a flow diagram illustrating a method of configuring an ultraviolet lamp system in accordance with an exemplary embodiment of the invention.

DETAILED DESCRIPTION

In accordance with certain exemplary embodiments of the invention, the type of current waveform driving one or more magnetrons of a ultraviolet lamp system is a hybrid current waveform. That is, the current is not exactly AC or DC, but a hybrid. For example, the current waveform may be a DC waveform for a large percentage (e.g., 90%) of its duty cycle, and then quickly falls and rises once. Other current waveforms are contemplated. Such a current waveform may be accomplished by modifying the internal software and firmware of a switch mode power supply (e.g., a solid state DC switching power supply, a solid state switch mode power supply, etc.). Aspects of the invention may be used, for example, for improved vertical (or angled) lamp performance with additive bulb types while still maintaining a relatively low UV output ripple.

Aspects of the invention may involve the modification of an internal high voltage engine control firmware of a switch mode power supply. This may be accomplished by adding new software defined parameters which may be adjusted in order to introduce and manipulate a broad range of short interrupts of the current delivered to the magnetrons. This may, in turn, stimulate plasma dynamics in the bulb similar to ferro-resonant supplies leading to improved bulb performance, for example, in non-linear (e.g., vertical, angled, etc.) applications.

Figure 1:
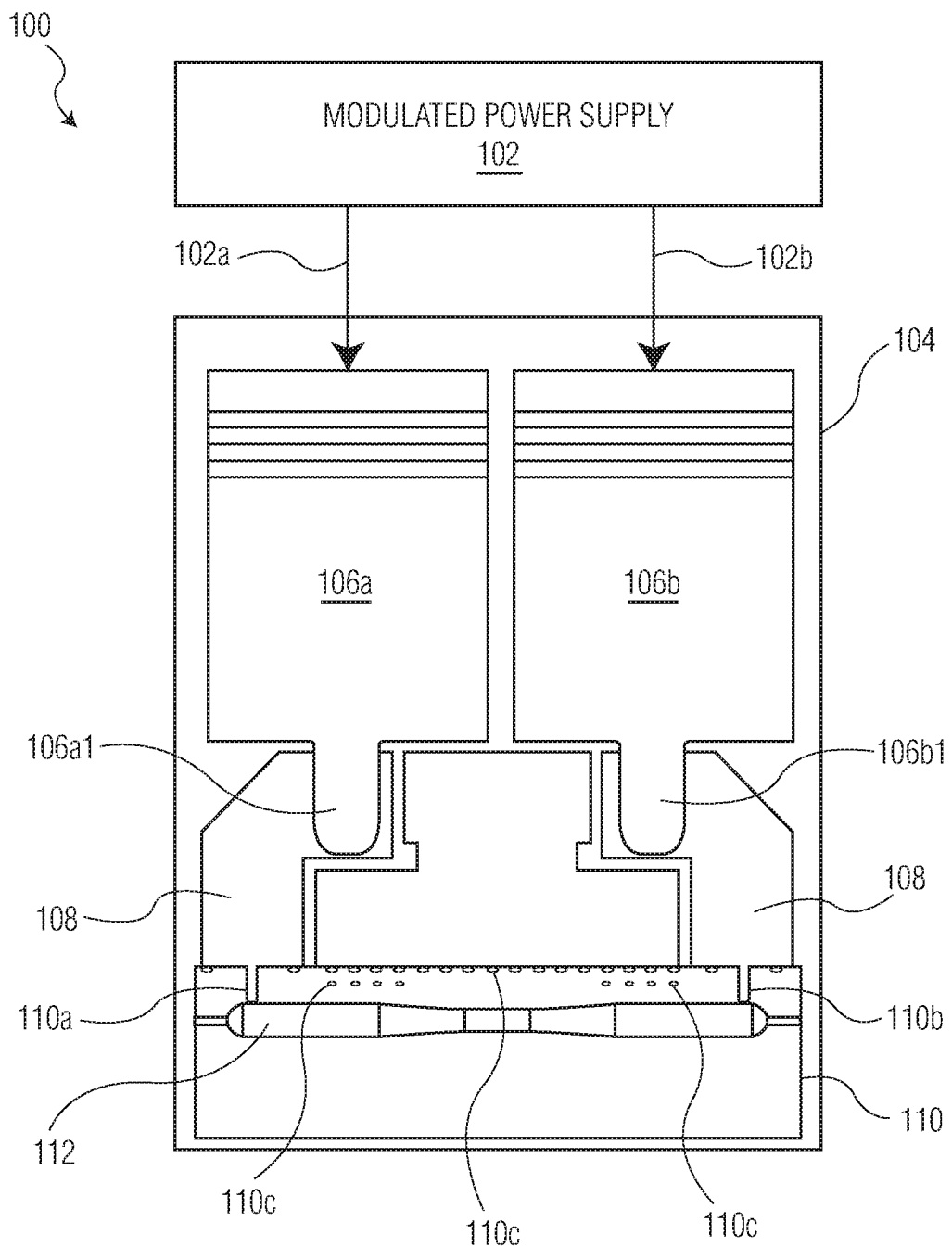
FIG. 1 is a block diagram of an ultraviolet lamp system in accordance with an exemplary embodiment of the invention.
Figure 2:
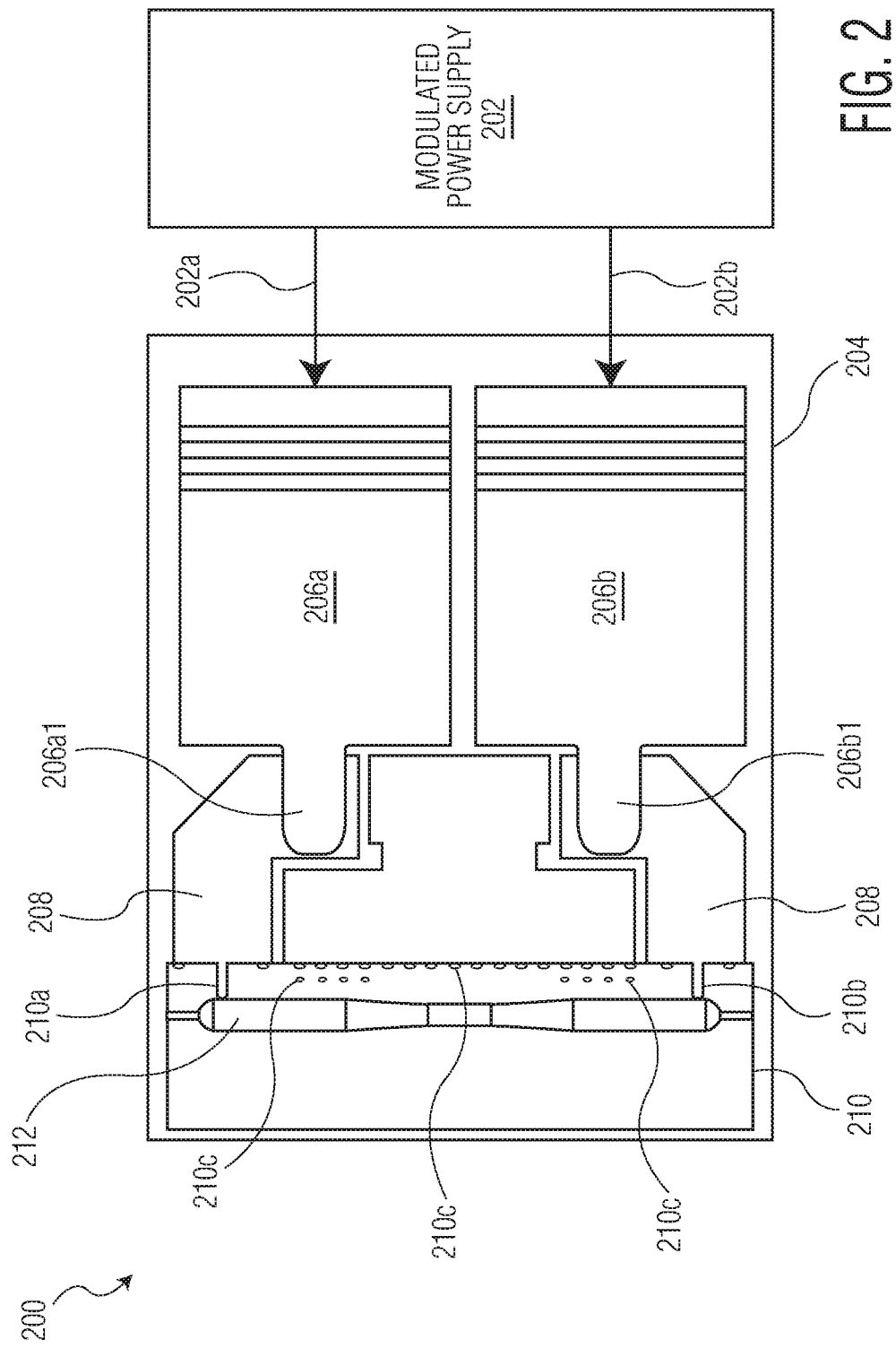
FIG. 2 is a block diagram of another ultraviolet lamp system in accordance with an exemplary embodiment of the invention.
Figure 3:
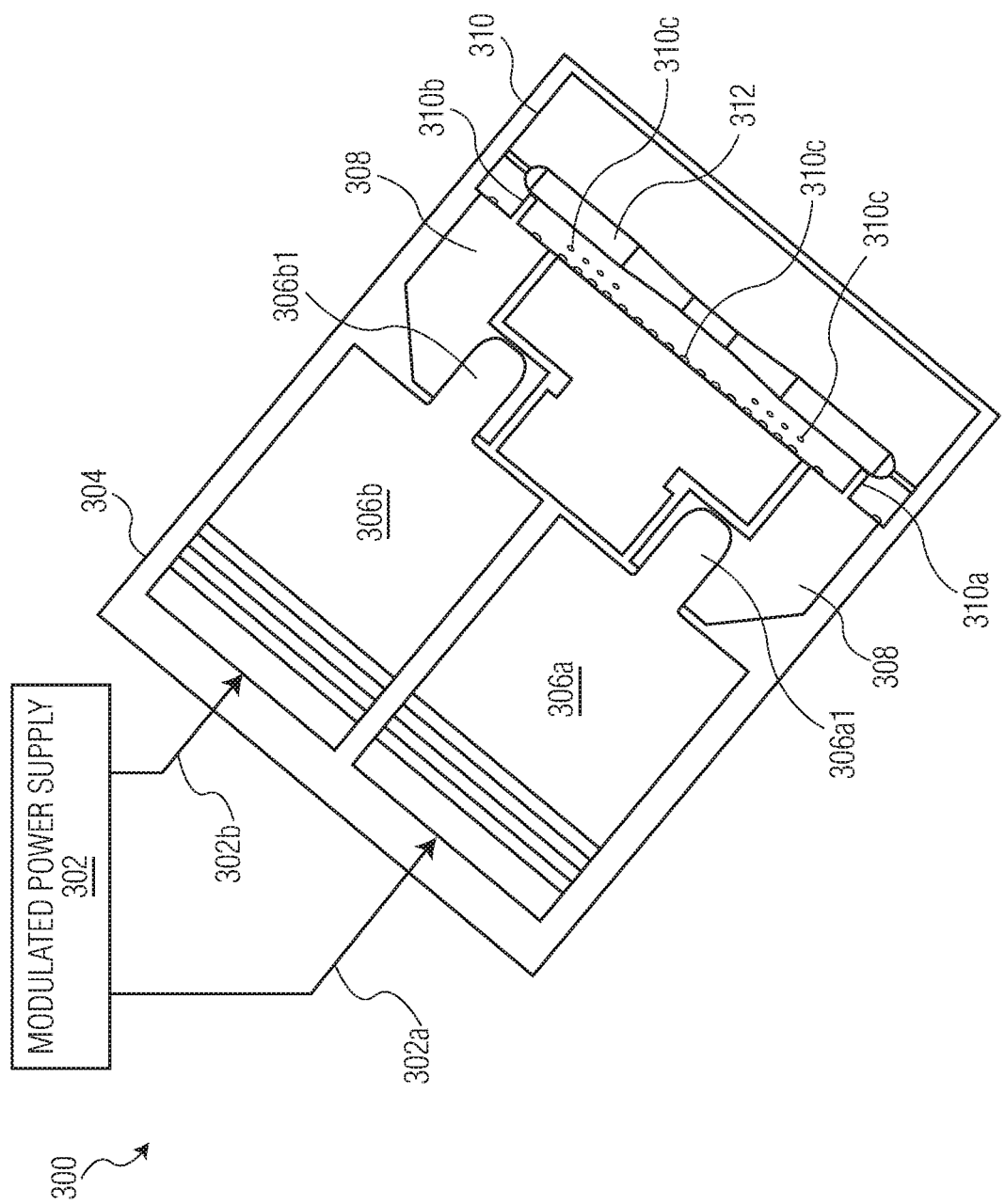
FIG. 3 is a block diagram of yet another ultraviolet lamp system in accordance with an exemplary embodiment of the invention.

Characteristics of the current interrupt features (e.g., power curve shape, timing, duration, etc.), as well as the interrupt frequency for each magnetron (e.g., two magnetrons as illustrated in FIGS. 1-3), may be evaluated in a systematic manner using combinations of four adjustable software parameters to characterize the interrupt. The four exemplary adjustable software parameters include: (i) the duty cycle (e.g., % time between interrupts); (ii) the frequency (e.g., the number of interrupts per second—such as 60 to 360 Hz by 1 Hz); (iii) the phase offset (e.g., phase angle delay (time difference between first and second magnetron interrupts); (iv) the filter factor (e.g., used to vary the interrupt shape, that is, drop and rise rate and magnitude of the magnetron current interrupt); and (v) peak current of the electrical energy provided to the magnetron.

A test procedure may be utilized, including a number of different instruments, to monitor the lamp performance in real time as various parameters are adjusted. For example, UV radiometers connected to data loggers may be used to monitor and compare changes in UV output when rotating the bulb from a horizontal orientation to a vertical orientation. Photographs and video recordings may be used to study the complex plasma dynamics within the bulb that normally occur with ferro-resonant power supplies and also occur to various degrees with the better combinations of experimental interrupt parameters. Thermal imaging may also be used to evaluate the changes in the bulb envelope temperatures that can occur when in a vertical orientation.

It will be appreciated that higher duty cycles may be preferable if they are effective in preventing color separation because a higher percentage of the cycle is in a no-ripple DC mode along with reduced interrupt durations. Further, only a small increase in the maximum magnetron current setting may be needed to maintain the baseline UV output. The baseline UV output may be defined as the normal UV performance in a horizontal orientation (e.g., with no-ripple DC current of 890 mA to the magnetrons).

After evaluating many combinations of the five current limiting software parameters it has been determined that UV lamp system performance (e.g., including a bulb in a vertical configuration, an angled configuration, etc.) can now be restored for problematic additive bulbs using a switch mode power supply. A specific combination of the software parameters that provides desirable results, with minimal changes to the power supply hardware components, is typically desirable. Essentially, aspects of the invention combine the advantages of switch mode power supplies (e.g., solid state DC power supplies, solid state switch mode power supplies, etc.) and ferroresonant power supplies without the primary drawbacks of either.

A fixed set of software parameters added to a switch mode power supply can easily be turned on or off by a user, thereby allowing the user to operate the switch mode power supply (i) in a full DC mode for certain applications (e.g., non-additive bulbs in horizontal or vertical orientations), and (ii) in an interrupt current mode for other applications (e.g., additive bulbs operating in non-horizontal orientations in order to prevent color separation and poor performance). As described below, the ultraviolet lamp system may automatically determine the appropriate mode (and/or current profile) to be provided to the at least one magnetron, for example, using sensors or the like.

This invention may also be useful for any lamp which uses plasma to emit UV, such as arc lamps.

Referring now to the drawings, FIG. 1 illustrates an ultraviolet lamp system 100. Ultraviolet lamp system 100 includes a modulated power supply 102 and an irradiator 104. Irradiator 104 includes a first magnetron 106a (having antenna 106a1) and a second magnetron 106b (having antenna 106b1). Modulated power supply 102 provides electrical energy to each of first magnetron 106a and second magnetron 106b, via current signals 102a and 102b. Magnetrons 106a, 106b emit microwave energy into waveguide 108, and waveguide 108 directs the microwave energy (RF) through slots 110a and 110b defined by reflector 110 (reflector 110 also defines cooling holes 110c). Thus, the microwave energy is provided into a cavity defined by reflector 110. The microwave energy is received by, and interacts with, bulb 112, causing bulb 112 to emit UV energy as desired in the given application (e.g., a UV curing application).

As shown in FIG. 1, bulb 112 is arranged in a "horizontal" configuration. It is appreciated that in certain applications, it is desirable to arrange a bulb in an ultraviolet lamp system in a "vertical" or "angled" configuration. FIG. 2 illustrates an ultraviolet lamp system 200 including a bulb 212 arranged in a "vertical" configuration, while FIG. 3 illustrates an ultraviolet lamp system 300 including a bulb 312 arranged in an "angled" configuration. Otherwise, the various elements of FIGS. 2-3 are similar to those described above with respect to FIG. 1.

Referring specifically to FIG. 2, ultraviolet lamp system 200 includes a modulated power supply 202 and an irradiator 204. Irradiator 204 includes a first magnetron 206a (having antenna 206a1) and a second magnetron 206b (having antenna 206b1). Modulated power supply 202 provides electrical energy to each of first magnetron 206a and second magnetron 206b, via current signals 202a and 202b. Magnetrons 206a, 206b emit microwave energy into waveguide 208, and waveguide 208 directs the microwave energy (RF) through slots 210a and 210b defined by reflector 210 (reflector 210 also defines cooling holes 210c). Thus, the microwave energy is provided into a cavity defined by reflector 210. The microwave energy is received by, and interacts with, bulb 212, causing bulb 212 to emit UV energy as desired in the given application (e.g., a UV curing application).

Referring specifically to FIG. 3, ultraviolet lamp system 300 includes a modulated power supply 302 and an irradiator 304. Irradiator 304 includes a first magnetron 306a (having antenna 306a1) and a second magnetron 306b (having antenna 306b1). Modulated power supply 302 provides electrical energy to each of first magnetron 306a and second magnetron 306b, via current signals 302a and 302b. Magnetrons 306a, 306b emit microwave energy into waveguide 308, and waveguide 308 directs the microwave energy (RF) through slots 310a and 310b defined by reflector 310 (reflector 310 also defines cooling holes 310c). Thus, the microwave energy is provided into a cavity defined by reflector 310. The microwave energy is received by, and interacts with, bulb 312, causing bulb 312 to emit UV energy as desired in the given application (e.g., a UV curing application).

The electrical energy provided by each of modulated power supplies 102, 202, and 302 (or any modulated power supply within the scope of the invention, such as a switch mode power supply) may be modulated (as desired in the application) such that light output from the respective bulb 112, 212, and 312 is more uniform in at least one of intensity and spectral output. More specifically, each of the current signals (e.g., current signals 102a and 102b from modulated power supply 102, current signals 202a and 202b from modulated power supply 202, current signals 302a and 302b from modulated power supply 302, etc.) is modulated to provide light output from the respective bulb (112, 212, and 312) that is more uniform in at least one of intensity and spectral output, as compared to light output that would result from unmodulated current signals (e.g., pure DC signals).

The modulated electrical energy (also referred to as modulated electrical current signals, or a modulated current profile, etc.) may be described/characterized in a number of different ways. For example, such modulated electrical energy may be considered to be the output of the modulated power supply that is pulse width modulated. Such pulse width modulation may be accomplished using software control of the modulated power supply.

Such modulated electrical energy may be described/characterized by adapting the modulated power supply to selectively remove electrical energy supplied to the at least one magnetron (or in FIGS. 1-3, to each of the two magnetrons) to modulate the electrical energy such that light output from the bulb is more uniform in at least one of intensity and spectral output. By selectively removing the electrical energy, the modulated power supply may be said to operate in an interrupt current mode, as opposed to a full DC mode without the selective removal/interruption of current.

Figure 4:
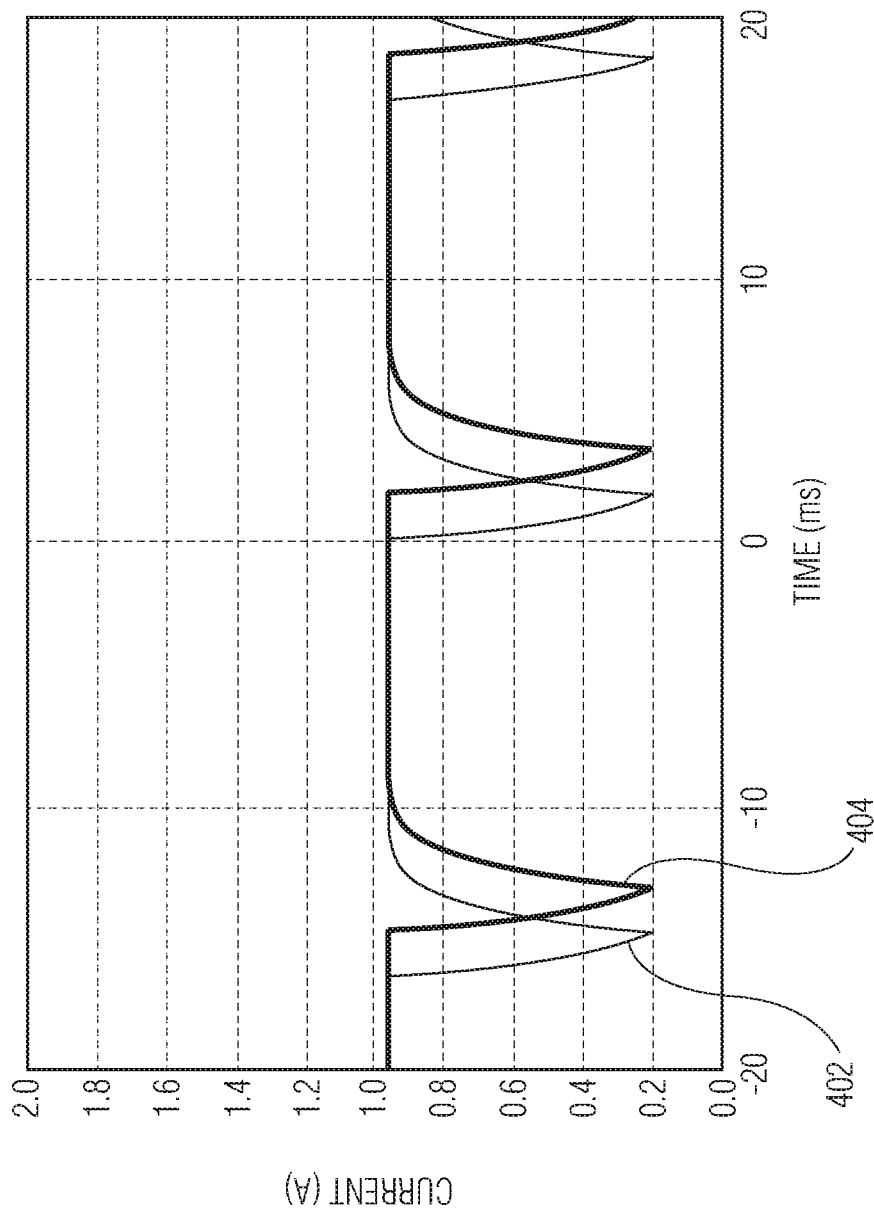
FIG. 4 is a signal diagram illustrating current signals provided by a power supply of an ultraviolet lamp system in accordance with an exemplary embodiment of the invention.

In any case, the modulated power supply (e.g., modulated power supply 102 in FIG. 1, modulated power supply 202 in FIG. 2, modulated power supply 302 in FIG. 3, etc.) varies the output current signals to provide a modulated current profile. FIG. 4 illustrates an example of such varied output current signals. Specifically, FIG. 4 illustrates a first current signal 402, and a second current signal 404. For example, first current signal 402 may correspond to a current signal provided to a first magnetron (e.g., one of current signal 102a or current signal 102b in FIG. 1, one of current signal 202a or current signal 202b in FIG. 3, one of current signal 302a or current signal 302b in FIG. 3, etc.), and second current signal 404 may correspond to a current signal provided to a second magnetron (e.g., the other of current signal 102a or current signal 102b in FIG. 1, the other of current signal 202a or current signal 202b in FIG. 3, the other of current signal 302a or current signal 302b in FIG. 3, etc.).

Although the power supplies illustrated in FIGS. 1-3 are labelled as "modulated" power supplies, according to certain exemplary embodiments of the invention, the power supply (which may also be termed a switch mode power supply) may also be operated in a full DC mode. For example, a set of software parameters may be added to the power supply (e.g., the modulated power supply) that can be turned on or off (or otherwise activated) by a user, thereby allowing the user to operate the power supply (i) in a full DC mode for certain applications (e.g., non-additive bulbs in horizontal or vertical orientations), and (ii) in an interrupt current mode for other applications (e.g., additive bulbs operating in non-horizontal orientations in order to prevent color separation and poor performance).

Further still, according to aspects of the invention, operation of the modulated power supply may be configured for a plurality of applications. For example, variables such as bulb type/specification, bulb configuration (e.g., horizontal, vertical, angled, etc.), magnetron orientation, desired spectral output and uniformity, etc. may be utilized to configure an electrical current profile of the modulated power supply for a number of applications. In such a case, during operation of the ultraviolet lamp system, a user may select the appropriate current profile (e.g., selecting through software, or a user interface, etc.) based on the application being used by the user.

In other examples, sensors may be included in the ultraviolet lamp system to identify the appropriate variable(s)/parameter(s) used for the selection of the appropriate current profile. Then, upon sensing the existence of such a variable(s), methods according to the invention may include the ultraviolet lamp system automatically selecting (and/or implementing) the appropriate current profile. In a specific example, the ultraviolet lamp system may include a sensor to identify the bulb type/specification, the lamp orientation (e.g., including bulb orientation such as horizontal, vertical, or angled), or other variables. With this information, and based on prior testing or experimentation, the appropriate current profile (and/or mode such as the aforementioned full DC mode or the interrupt current mode) may be implemented and/or selected.

As used herein, the term "current profile" is intended to broadly refer to any details of the electrical energy to be applied by a power supply (e.g., a modulated power supply such as shown in FIGS. 1-3) to one or more magnetrons in connection with an ultraviolet lamp system. For example, FIG. 4 illustrates 2 exemplary current signals which alone, or together, may be considered a current profile.

Aspects of the invention result in a number of benefits as compared to conventional technologies. One such benefit which may not be readily apparent is a reduction in the electrical energy used in certain applications. That is, through the use of the "modulated" electrical energy as described herein, the peak current is reduced as compared to conventional ferro-resonant power supply systems, while achieving much or all of the benefit of such systems. Such a reduced peak current results in less energy being used, and typically results in a longer lifetime for the certain elements of the ultraviolet lamp system such as the magnetrons.

Figure 5:
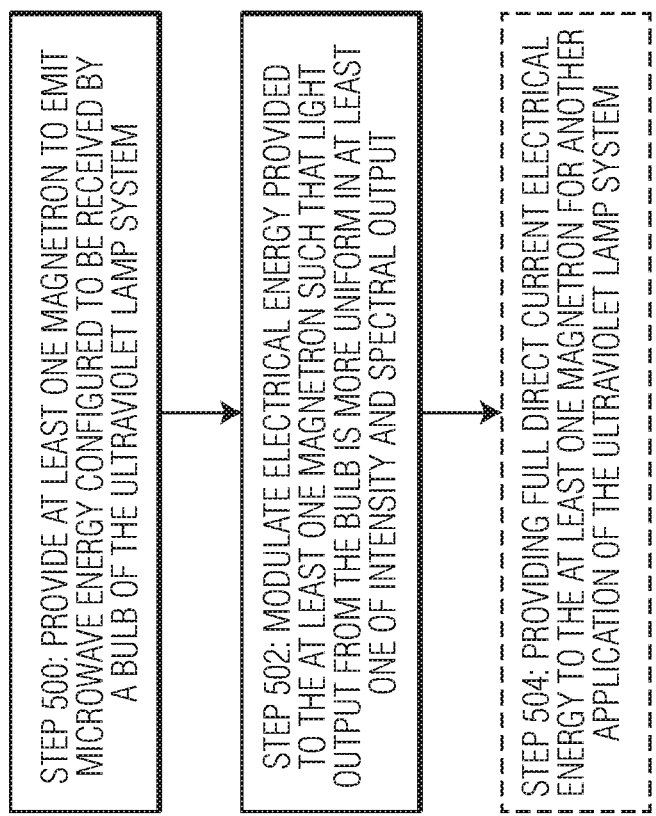
FIG. 5 is a flow diagram illustrating a method of operating an ultraviolet lamp system in accordance with an exemplary embodiment of the invention.

FIGS. 5-6 are flow diagrams illustrating a method of operating an ultraviolet lamp system, and a method of configuring an ultraviolet lamp system, respectively. As is understood by those skilled in the art, certain steps included in the flow diagrams may be omitted; certain additional steps may be added; and the order of the steps may be altered from the order illustrated.

Referring specifically to FIG. 5, at Step 500, at least one magnetron is provided to emit microwave energy configured to be received by a bulb of the ultraviolet lamp system. For example, each of FIGS. 1-3 illustrate exemplary magnetrons (i.e., magnetrons 106a and 106b in FIG. 1, magnetrons 206a and 206b in FIG. 2, magnetrons 306a and 306b in FIG. 3, etc.) provided to emit microwave energy configured to be received by a bulb of the respective ultraviolet lamp system 100, 200, 300. At Step 502, electrical energy provided to the at least one magnetron from a power supply is modulated such that light output from the bulb is more uniform in at least one of intensity and spectral output. For example, the electrical energy may be modulated to have a desired current profile. In a specific example, the electrical energy may be modulated using pulse width modulation. The modulation may also be regarded as the selective removal/interruption of the electrical energy according to the desired current profile (e.g., see FIG. 4).

In a specific case, where the bulb is configured to be operated in a vertical orientation, a first magnetron may be configured to emit microwave energy configured to be received by a lower portion of the bulb in the vertical configuration, and a second magnetron may be configured to emit microwave energy configured to be received by an upper portion of the bulb in the vertical configuration. In such a case, Step 502 may include operating the power supply to repeatedly remove or reduce the electrical energy provided to each of the first magnetron and the second magnetron according to a pattern whereby the electrical energy is removed from the first magnetron prior to removal of the electrical energy from the second magnetron.

Referring to optional Step 504, full direct current electrical energy is provided to the at least one magnetron for another application of the ultraviolet lamp system. The another application may include, for example, at least one of (i) another bulb as compared to the bulb of Steps 500 and 502, and (ii) a unique configuration of the bulb of as compared to a configuration of the bulb as used in Step 502. This application of full direct current electrical energy may be in connection with the full DC mode described above for certain applications (e.g., non-additive bulbs in horizontal or vertical orientations), as opposed to the interrupt current mode described above for other applications (e.g., additive bulbs operating in non-horizontal orientations in order to prevent color separation and poor performance).

Referring specifically to FIG. 6, at Step 600, at least one magnetron is provided to emit microwave energy configured to be received by a bulb of an ultraviolet lamp system. For example, each of FIGS. 1-3 illustrate exemplary magnetrons (i.e., magnetrons 106a and 106b in FIG. 1, magnetrons 206a and 206b in FIG. 2, magnetrons 306a and 306b in FIG. 3, etc.) provided to emit microwave energy configured to be received by a bulb of the respective ultraviolet lamp system 100, 200, 300. At Step 602, a power supply is provided for providing electrical energy to the at least one magnetron. For example, each of FIGS. 1-3 illustrates an example respective modulated power supply 102, 202, and 302. At Step 604, at least one performance parameter of the bulb is monitored while varying at least one modulation parameter of the electrical energy provided to the at least one magnetron. Examples of the at least one performance parameter of the bulb include (i) a temperature of the bulb (wherein the temperature may be a plurality of temperature values, a temperature profile, etc.), (ii) an light intensity value of the bulb (wherein the light intensity value may be a plurality of light intensity values, a light intensity profile, etc.), and (iii) a spectral output of the bulb (wherein the spectral output of the bulb may be a plurality of temperature spectral output values, a spectral output profile, etc.). Examples of the at least one modulation parameter of the electrical energy include (i) a duty cycle of the electrical energy, (ii) a frequency of interruptions to the electrical energy, (iii) a phase offset of an interruption to the electrical energy applied a first magnetron as compared to a phase offset of an interruption to the electrical energy application to a second magnetron, (iv) a filter factor of an interruption of the electrical energy, and (v) peak current of the electrical energy provided to the magnetron. At Step 606, a current profile is determined for the electrical energy to be provided to the magnetron after Step 604. The current profile determined in Step 606 may include values of at least one modulation parameter utilized to provide an acceptable value for at least one performance parameter of the bulb (as determined by Step 604).

In accordance with aspects of the invention, Steps 604 and 606 may be repeated for a plurality of applications, each of the applications including at least one of (i) a unique bulb as compared to others of the applications, and (ii) a unique configuration of the bulb as compared to others of the applications.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. An ultraviolet lamp system comprising:
   a bulb;
   at least one magnetron configured to emit microwave energy configured to be received by the bulb, the at least one magnetron including (i) a first magnetron configured to emit microwave energy configured to be received by the bulb, and (ii) a second magnetron configured to emit microwave energy configured to be received by the bulb; and
   a power supply configured to provide electrical energy to the at least one magnetron,
   wherein the power supply is adapted to modulate the electrical energy provided to each of the first magnetron and the second magnetron such that light output from the bulb is more uniform in at least one of intensity and spectral output,
   wherein the bib is configured to be operated in a vertical orientation, and wherein the first magnetron is configured to emit microwave energy configured to be received by a lower portion of the bulb in the vertical configuration, and wherein the second magnetron is configured to emit microwave energy configured to be received by an upper portion of the bulb in the vertical configuration.

2. The ultraviolet lamp system of claim 1 wherein the power supply is adapted to selectively remove electrical energy supplied to the at least one magnetron to modulate the electrical energy such that light output from the lamp is more uniform in at least one of intensity and spectral output.

3. The ultraviolet lamp system of claim 1 wherein the power supply is adapted to modulate the electrical energy provided to the at least one magnetron using pulse width modulation.

4. The ultraviolet lamp system of claim 1 wherein the power supply is configured to operate to repeatedly remove or reduce the electrical energy provided to each of the first magnetron and the second magnetron according to a pattern whereby the electrical energy is removed from the first magnetron prior to removal of the electrical energy from the second magnetron.

5. A method of operating an ultraviolet lamp system, the method comprising the steps of:
   (a) providing at least one magnetron to emit microwave energy configured to be received by a bulb of the ultraviolet lamp system, wherein step (a) includes providing a first magnetron configured to emit microwave energy configured to be received by the bulb, and providing a second magnetron configured to emit microwave energy configured to be received by the bulb; and
   (b) modulating electrical energy provided to each of the first magnetron and the second magnetron such that light output from the bulb is more uniform in a least one of intensity and spectral output,
   wherein the bulb is configured to be operated in a vertical orientation, and wherein the first magnetron is configured to emit microwave energy configured to be received by a lower portion of the bulb in the vertical configuration, and wherein the second magnetron is configured to emit microwave energy configured to be received by an upper portion of the bulb in the vertical configuration.

6. The method of claim 5 wherein step (b) includes selectively removing electrical energy supplied to the at least one magnetron to modulate the electrical energy such that light output from the lamp is more uniform in at least one of intensity and spectral output.

7. The method of claim 5 wherein step (b) includes modulating electrical energy provided to the at least one magnetron, using pulse width modulation, such that light output from the bulb is more uniform in at least one of intensity and spectral output.

8. The method of claim 5 wherein step (b) includes operating the power supply to repeatedly remove or reduce the electrical energy provided to each of the first magnetron and the second magnetron according to a pattern whereby the electrical energy is removed from the first magnetron prior to removal of the electrical energy from the second magnetron.

9. A method of operating an ultraviolet lamp system, the method comprising the steps of:
   (a) providing at least one magnetron to emit microwave energy configured to be received by a bulb of the ultraviolet lamp system, wherein step (a) includes providing a first magnetron configured to emit microwave energy configured to be received by the bulb, and providing a second magnetron configured to emit microwave energy configured to be received by the bulb;

(b) modulating electrical energy provided to the at least one magnetron such that light output from the bulb is more uniform in a least one of intensity and spectral output; and (c) providing full direct current electrical energy to the at least one magnetron for an application of the ultraviolet lamp system including at least one of (i) another bulb as compared to the bulb of steps (a) and (b), and (ii) a unique configuration of the bulb as compared to a configuration of the bulb as used in step (b).

* * * * *

UNITED STATES PATENT AND TRADEMARK OFFICE
CERTIFICATE OF CORRECTION

PATENT NO.        : 10,497,556 B2                                       Page 1 of 1
APPLICATION NO.   : 16/179400
DATED             : December 3, 2019
INVENTOR(S)       : Brett Skinner et al.

It is certified that error appears in the above-identified patent and that said Letters Patent is hereby corrected as shown below:

In the Claims

Claim 1, Column 9, Line 60 should read:
wherein the bulb is configured to be operated in a vertical Signed and Sealed this
Third Day of March, 2020

Andrei Iancu
*Director of the United States Patent and Trademark Office*